United States Patent
Bocquel et al.

(10) Patent No.: US 10,250,088 B2
(45) Date of Patent: Apr. 2, 2019

(54) FORGED MAGNET WHEEL FOR MOTOR VEHICLE ALTERNATOR PROVIDED WITH PERMANENT INTERPOLAR MAGNETS

(71) Applicant: VALEO EQUIPEMENTS ELECTRIQUES MOTEUR, Creteil (FR)

(72) Inventors: Michel Bocquel, Cabourg (FR); Henri Delianne, Maresville (FR); Pierre-Yves Bilteryst, Brimeux (FR); Herve Ribot, Peronne (FR)

(73) Assignee: Valeo Equipements Electriques Moteur, Creteil (FR)

( * ) Notice: Subject to any disclaimer, the term of this patent is extended or adjusted under 35 U.S.C. 154(b) by 250 days.

(21) Appl. No.: 15/126,654

(22) PCT Filed: Mar. 2, 2015

(86) PCT No.: PCT/FR2015/050504
§ 371 (c)(1),
(2) Date: Sep. 16, 2016

(87) PCT Pub. No.: WO2015/145009
PCT Pub. Date: Oct. 1, 2015

(65) Prior Publication Data
US 2017/0093234 A1    Mar. 30, 2017

(30) Foreign Application Priority Data
Mar. 25, 2014   (FR) ..................... 14 52499

(51) Int. Cl.
*H02K 1/27* (2006.01)
*H02K 1/24* (2006.01)
(Continued)

(52) U.S. Cl.
CPC ............... *H02K 1/243* (2013.01); *B60L 1/00* (2013.01); *H02K 1/27* (2013.01); *H02K 15/022* (2013.01); *H02K 21/044* (2013.01)

(58) Field of Classification Search
CPC .......... H02N 2/188; H02N 2/186; H02K 1/34; F03G 7/08; H01L 41/12; H01L 41/125
(Continued)

(56) References Cited

U.S. PATENT DOCUMENTS 7,676,902 B2 * 3/2010 Kawai ................. B21K 1/30
                                                                    29/598
9,461,237 B2 * 10/2016 Ueno ................... H01L 41/125
(Continued)

FOREIGN PATENT DOCUMENTS

FR          2939252          6/2010
JP          2010252560       11/2010

*Primary Examiner* — Forrest M Phillips
(74) *Attorney, Agent, or Firm* — Berenato & White, LLC

(57) ABSTRACT

The pole wheel according to the invention is intended for the rotor of a Lundell rotating electric machine. The pole wheel is obtained entirely by forging and comprises a central core provided with a central bore in a central axis of the pole wheel intended to receive a shaft of the rotor, a plurality of pole teeth (10g, 11g) distributed in a regular manner at the circumference of the pole wheel and extending substantially parallel to the central axis of the pole wheel, and an annular part forming a plate and extending between the central core and parts forming bases of the pole teeth. According to the invention, the pole wheel comprises a plurality of reservoirs (105) provided in the parts forming bases of the pole teeth.

17 Claims, 3 Drawing Sheets

(51) Int. Cl.
*H02K 21/04* (2006.01)
*H02K 15/02* (2006.01)
*B60L 1/00* (2006.01)

(58) Field of Classification Search
USPC .......................................................... 310/26
See application file for complete search history.

(56) References Cited

U.S. PATENT DOCUMENTS

| | | | |
|---|---|---|---|
| 9,571,011 B2* | 2/2017 | Ueno | H01L 41/125 |
| 2002/0138968 A1 | 10/2002 | Kato et al. | |
| 2013/0140919 A1* | 6/2013 | Ueno | H01L 41/125 |
| | | | 310/26 |
| 2014/0346902 A1* | 11/2014 | Ueno | H01L 41/125 |
| | | | 310/26 |

* cited by examiner

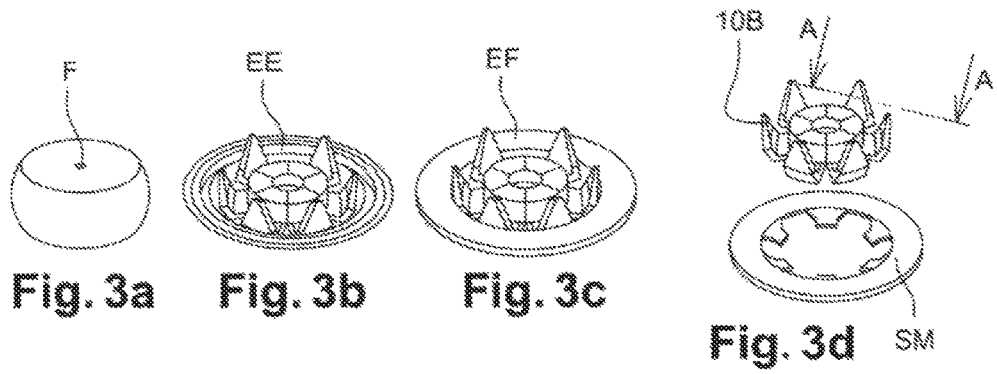
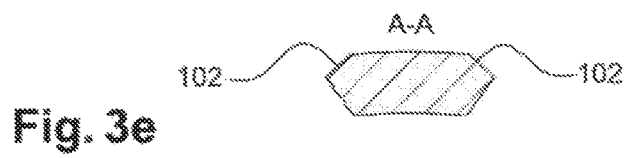
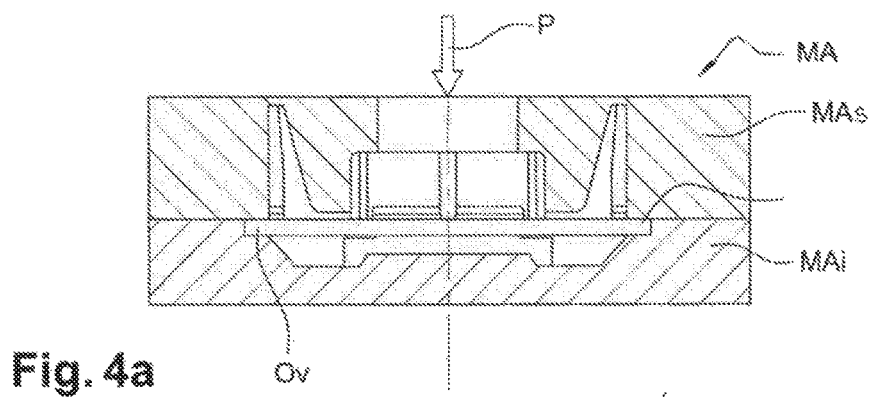
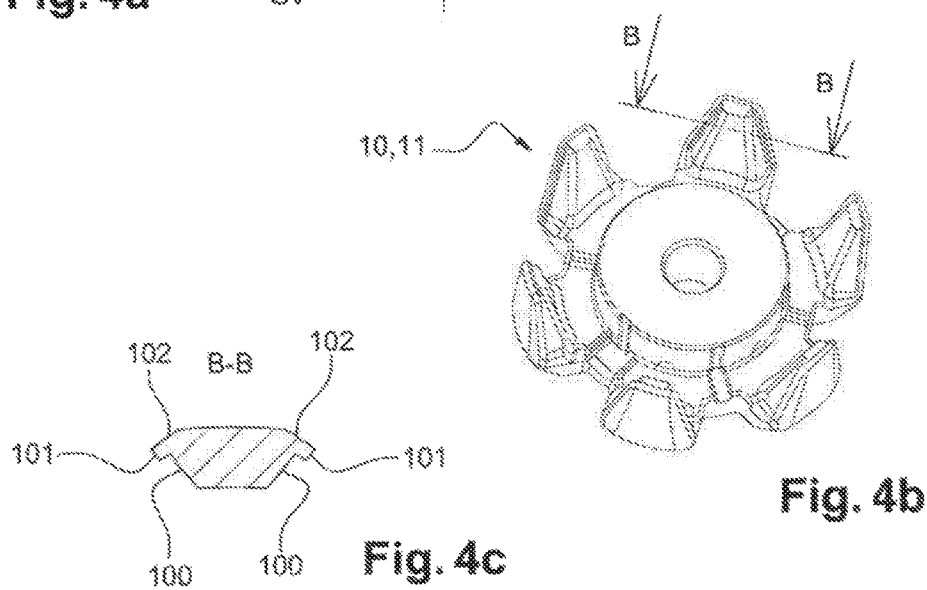

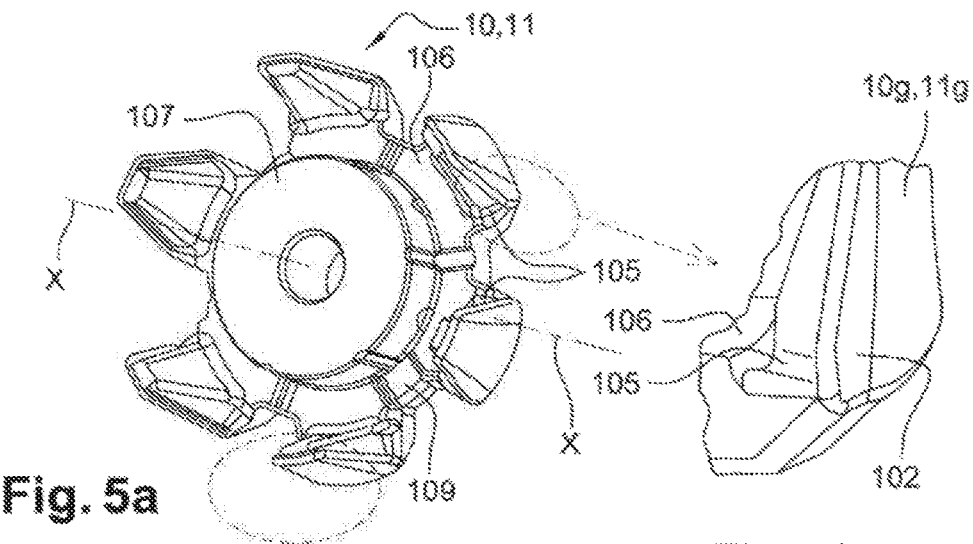
Fig. 5a
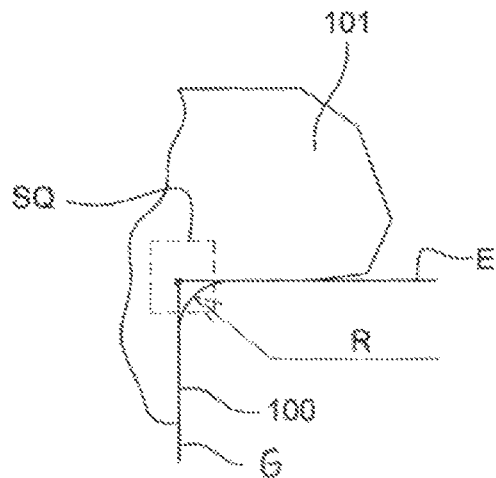
Fig. 5b
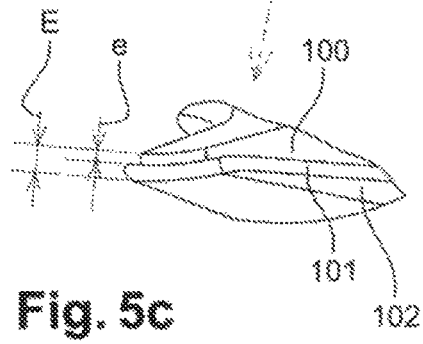
Fig. 5c
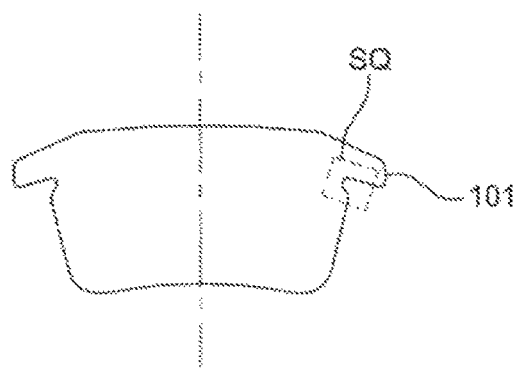
Fig. 5e
Fig. 5d

FORGED MAGNET WHEEL FOR MOTOR VEHICLE ALTERNATOR PROVIDED WITH PERMANENT INTERPOLAR MAGNETS

CROSS-REFERENCE TO RELATED APPLICATIONS AND CLAIM TO PRIORITY

This application is a national stage application of International Application No. PCT/FR2015/050504 filed Mar. 2, 2015, which claims priority to French Patent Application No. 1452499 filed Mar. 25, 2014, the disclosures of which are incorporated herein by reference and to which priority is claimed.

FIELD OF THE INVENTION

In general, the invention relates to forged magnet wheels which are designed for the rotor of a rotary electrical machine of the Lundell type, such as an alternator or an alternator-starter of a motor vehicle. More particularly, the invention relates to forged magnet wheels for a rotor which is equipped with permanent interpolar magnets.

BACKGROUND OF THE INVENTION

In the production of magnet wheels for alternators with claws, it is known to use forging operations.

Rotors which are equipped with permanent interpolar magnets require the production of grooves for accommodation of the magnet, and magnet lips in the teeth of the magnet wheels. The magnet lips ensure retention in place of the permanent magnets which are subjected to the effects of centrifugal force when the rotor is rotating.

It is known to produce the grooves for accommodation of the magnet and the magnet lips by means of a machining operation which takes place after the forged magnet wheel has been obtained. In the industrial process for production of the magnet wheels, this machining operation has the disadvantage of increasing the duration of production and the cost of the part.

U.S. Pat. No. 7,676,902 B2 describes a method for production of a magnet wheel in which the operation of machining the grooves for accommodation of the magnet is eliminated. The magnet wheel is obtained by using only forging operations. The grooves for accommodation of the magnet and the magnet lips are pre-formed by hot forging. Cold forging tools are then used in order to complete the production of the grooves and lips, as well as the chamfers provided in the teeth of the magnet wheel. These cold forming tools are actuated radially, i.e. according to the radius of the magnet wheel.

SUMMARY OF THE INVENTION

The objective of the present invention is to provide a magnet wheel, the design of which makes possible a method for forging of the grooves for accommodation of the magnet and magnet lips other than the known method, previously described, according to the prior art.

The magnet wheel according to the invention is designed for the rotor of a rotary electrical machine of the Lundell type. The magnet wheel is obtained entirely by forging, and comprises a central core, a plurality of polar teeth distributed regularly on the circumference of the magnet wheel, the polar teeth extending substantially parallel to a central axis of the magnet wheel and comprising grooves for accommodation of the magnet and magnet lips, and an annular part which forms a plate, and extends between the central core and parts which form bases of the polar teeth. According to the invention, the magnet wheel comprises a plurality of reservoirs provided in the parts which form bases of the polar teeth.

These reservoirs which are located at the base of the teeth provide a space for the material which is upset during cold stamping, and make possible complete production of the piece by means of forging, with cold forging in the axial direction.

According to a particular characteristic of the invention, there are two reservoirs for each polar tooth.

According to another particular characteristic, the reservoirs are situated on both sides of the polar teeth.

According to yet another particular characteristic, the reservoirs are produced under an inner surface of the annular part which forms a plate.

According to yet another particular characteristic of the invention, a form at the base of the magnet lips, in the vicinity of the intersection between two perpendicular planes, is contained in a square SQ of 3 mm×3 mm centred on the said intersection.

According to yet another particular characteristic, the form at the base of the magnet lips has a radius of between 0.01 and 4 mm.

According to yet another particular characteristic, along the entire length of the polar teeth, from the parts which form bases to parts which form tips of the teeth, a ratio e/E between a thickness E of the polar teeth and a thickness e of the magnet lips is contained between e/R=0.5 and e/R=1.

BRIEF DESCRIPTION OF THE DRAWINGS

Other characteristics and advantages of the invention will become apparent from reading the following description of an embodiment of it, illustrated by:

FIGS. 3a to 3d which show the progressive formation of a basic magnet wheel in a step of hot forging;

FIG. 3e which shows a cross-section of tooth of the basic magnet wheel in FIG. 3d obtained upon completion of the hot forging step;

FIGS. 4a to 4c which concern a cold forging step:

FIG. 4a being a view in cross-section of a die used in the cold forging step;

FIG. 4b being a view in perspective of the magnet wheel according to the invention obtained upon completion of the cold forging step;

FIG. 4c showing a cross-section of tooth of the magnet wheel in FIG. 4b: and FIGS. 5a to 5d which show the magnet wheel according to the invention as well as details of its creation:

FIG. 5a being an enlarged representation of the magnet wheel according to the invention;

FIG. 5b being a partial view in perspective showing a reservoir provided at the base of the polar teeth of the magnet wheel according to the invention;

FIG. 5c being a partial view in perspective showing a configuration at the end of the tooth of the groove for accommodation of the magnet and the magnet lip;

FIG. 5d being a schematic view in cross-section showing an inner radius provided in the groove for accommodation of the magnet, at the base of the magnet lip; and FIG. 5e being a schematic view showing an inner radius provided in the groove for accommodation of the magnet, at the base of the magnet lip.

DETAILED DESCRIPTION OF THE PREFERRED EMBODIMENT(S)

The rotor and the magnet wheels of a rotary electrical machine of the Lundell type, also known as a claw machine, are now described with reference in particular to FIGS. 1 and 2.

Figure 1:
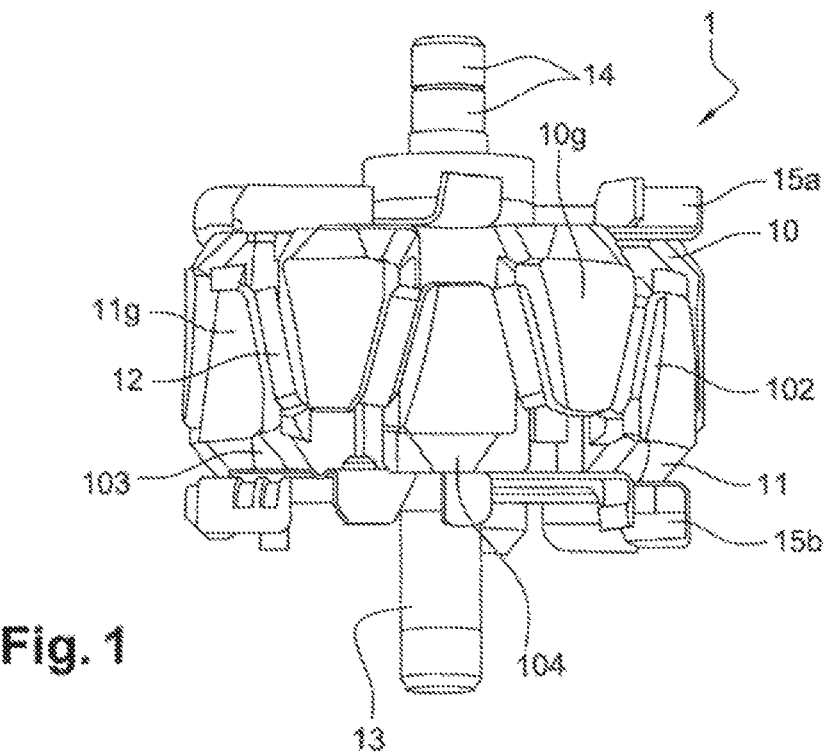
FIG. 1, which is a view showing a claw rotor of a motor vehicle alternator.

As shown in FIG. 1, the rotor 1 of a rotary electrical machine of the Lundell type substantially comprises two magnet wheels 10 and 11, permanent interpolar magnets 12, an excitation coil (not shown), a shaft 13, a collector 14, and two fans 15a, 15b which are used for cooling of the machine.

The magnet wheels 10, 11 are fitted on the shaft 13 such that their respective teeth 10g, 11g are imbricated, and form an alternation of magnetic South (S) and North (N) poles. These S and N magnetic poles are produced by the supply of electric current of the excitation coil which is inserted in a central core 107 (FIG. 2) of the magnet wheels 10 and 11. The excitation coil is supplied via the collector 14. A part which forms a plate 109 (FIG. 2) is present between the central core 107 and tooth bases of the teeth 10g, 11g of the magnet wheels 10, 11, and provides a space which is designed to be occupied by the excitation coil. As best shown in FIGS. 5a and 5b, the tooth base of each of the teeth 10g, 11g of the magnet wheels 10, 11 is a radially innermost portion of the each of the teeth 10g, 11g juxtaposed to the plate 109 of the magnet wheels 10, 11.

The interpolar magnets 12 are accommodated in the spaces which exist between the S and N teeth of the magnet wheels 10, 11. In the particular embodiment of the rotor 1 represented in FIG. 1, all of the inter-tooth spaces are occupied by the magnets 12. In other embodiments, the magnets 12 occupy only some of the inter-tooth spaces available.

Figure 2:
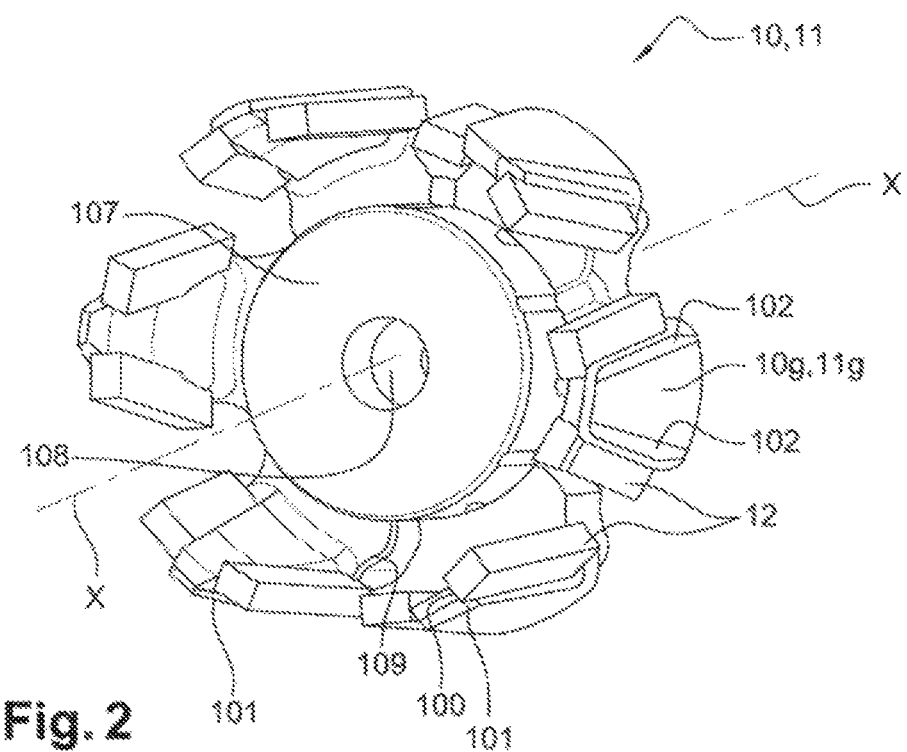
FIG. 2 which is a view in perspective of a magnet wheel equipped with permanent magnets, included in the rotor in FIG. 1.

In FIG. 2, the magnet wheel 10, 11 is shown with the permanent magnets 12. Grooves for accommodation of the magnet 100 and lips 101 are provided in the teeth 10g, 11g of the magnet wheel, in order to allow the magnets 12 to be fitted in the inter-tooth spaces, and to retain them in position when the rotor 1 is rotating, and the effects of the centrifugal force are being exerted.

Magnetic 102, aeraulic 103 and balancing 104 chamfers are also provided in the teeth 10g, 11g. The magnetic chamfers 102 are provided on both sides of the longitudinal edges of the tooth 10g, 11g, as shown in FIG. 2. The aeraulic 103 and balancing 104 chamfers can be seen in FIG. 1.

With reference more particularly to FIGS. 3a to 3e and 4a to 4c, a description is now provided of the forging method implemented for production of the magnet wheel according to the invention.

The forging method comprises two main steps, i.e. a hot forging step followed by a cold forging step.

The hot forging step makes it possible to obtain from a previously crushed iron blank F (FIG. 3a) a basic magnet wheel 10B (FIG. 3d) in which the chamfers 102, 103 and 104 have been formed. No groove and magnet lip pre-forming is carried out during this step EC.

In a conventional manner, the hot forging step comprises an operation of production of a blank EE (FIG. 3b), a finishing operation EF (FIG. 3c), and an operation of cutting surplus material SM (FIG. 3d) from the contours of the basic magnet wheel 10B.

Upon completion of the hot forging step, the teeth 10g, 11g are formed with the chamfers 102, 103 and 104. A cross-section of the tooth 10g, 11g according to a cross-sectional axis AA (FIG. 3d) is shown in FIG. 3e.

The purpose of the cold forging step is to provide the grooves for accommodation of the magnet 100 and lips 101 for the magnets 12. For this purpose, grooves are formed below the teeth 10g, 11g at the longitudinal edges of the latter. These grooves are formed by upsetting of the material, by means of two successive operations of cold stamping, using a die MA shown in FIG. 4a.

As shown in FIG. 4a, the die MA is formed by a lower die MAi and an upper die MAs.

The basic magnet wheel 10B is placed in a corresponding mould of the lower die MAi, with the teeth oriented upwards.

The upper die MAs comprises the definitive form of the tooth 10g, 11g, with the grooves for accommodation of the magnet 100 and the lips 101.

An opening Ov at the level of the join between the lower MAi and upper MAs dies is provided for the burr. The opening Ov has a dimension of between 0.1 L and L, L being the thickness of the plate 109 (FIG. 5a). Typically, the opening Ov has a dimension of between 0.1 mm and 6 mm, depending on the applications.

A vertical thrust P is exerted on the die MA, until contact takes place at the level of the join between the upper die MAs and the lower die MAi. The material is upset into the pre-form provided for this purpose in the die. A blocking counter-support is provided on the iron diameter of the part and/or the magnetic 102, aeraulic 103 and balancing 104 chamfers. The chamfers 102, 103 and 104 are formed and/or maintained, depending on the applications.

The cold forming operation is carried out in two successive stamping operations, with pressures which are equal or different, depending on the applications, and typically between 150 and 1500 tonnes.

An operation of cutting surplus material from the contours of the magnet wheel 10, 11 is carried out after the cold forming operation. The production of the magnet wheel 10, 11 is then completed and it comprises the magnet 100 accommodation grooves and lips 101, as well as the chamfers 102, 103 and 104 previously obtained in the hot forging step. A cross-section of the tooth 10g, 11g according to a cross-sectional axis BB (FIG. 4b) is shown in FIG. 4c.

Details of an embodiment of the magnet wheel 10, 11 are now described with reference to FIGS. 5a to 5d.

As shown in FIGS. 5a and 5b, reservoirs 105 are provided at the tooth base of each of the teeth 10g, 11g of the magnet wheel 10, 11. There are two of these reservoirs 105 for each tooth 10g, 11g, and they are situated on both sides of the latter. It will be noted in FIG. 5b that the reservoirs 105 are provided under an inner, substantially annular surface 106 of the part which forms the plate 109 of the magnet wheel 10, 11. The part which forms the plate 109 is contained between the tooth base of the teeth 10g, 11g and the central core 107 of the magnet wheel 10, 11. As best shown in FIGS. 5a and 5b, each of the reservoirs 105 is formed in the form of a depression (i.e., U-shaped channel or groove) extending radially outwardly in the tooth base of the teeth 10g, 11g from the inner surface 106 of the plate 109 of the magnet wheels 10, 11 toward the magnetic chamfer 102.

These reservoirs 105 which are located at the base of the teeth 10g, 11g are necessary in the magnet wheel according to the invention since they allow it to be produced by implementation of the forging method as has just been described. In fact, the reservoirs 105 provide a space for the material which is upset during the two successive stamping operations of the cold forging step, and thus make possible complete production of the part by forging, with cold forging in the axial direction.

Tests have been carried out by the inventive body, and have shown the advantage of certain particular characteristics described hereinafter of the magnet wheel 10, 11 according to the invention, in particular in terms of the mechanical resistance of the lips 101 to centrifuging.

With reference to FIG. 5d, a radius R at the base of the lip 101 will preferably be between R=0.01 mm and R=4 mm, depending on the applications. It will be noted that the form at the base of the lip 101 will preferably be contained within a square SQ of approximately 3 mm×3 mm which is centred on the intersection of the perpendicular planes E and G.

With reference to FIG. 5e, it will also be noted that other forms, with or without a radius, can be selected at the base of the lip 101, in the vicinity of the intersection between the planes E and G. According to the invention, these other forms will remain contained in the square SQ.

With reference to FIG. 5c, along the entire length of the tooth 10g, 11g, from its base to its tip shown in FIG. 5c, a ratio e/E between the thickness E of the tooth 10g, 11g and the thickness e of the lip 101 must be contained between e/R=0.5 and e/R=1.

The invention claimed is:

1. A magnet wheel (10, 11) for a rotor (1) of a rotary electrical machine of the Lundell type, said magnet wheel (10, 11) being obtained entirely by forging, the magnet wheel (10, 11) comprising:
 a central core (107);
 a plurality of polar teeth (10g, 11g) distributed regularly on a circumference of said magnet wheel (10, 11), said polar teeth (10g, 11g) extending substantially parallel to a central axis (X) of said magnet wheel (10, 11) and comprising grooves for accommodation of a magnet (100) and magnet lips (101); and
 an annular part forming a plate (109), and extending between said central core (107) and tooth bases of said polar teeth (10g, 11g), said tooth bases comprising a plurality of reservoirs (105);
 each of said reservoirs (105) being a depression in one of said tooth bases extending radially outwardly from said annular part, each said reservoir (105) providing space for material upset during a stamping operation.

2. The magnet wheel according to claim 1, wherein each of said polar teeth (10g, 11g) has two of said reservoirs (105).

3. The magnet wheel according to claim 1, wherein said reservoirs (105) are situated on both sides of each of said polar teeth (10g, 11g).

4. The magnet wheel according to claim 1, wherein said reservoirs (105) are disposed under an inner annular surface (106) of said annular part which forms said plate (109).

5. The magnet wheel according to claim 1, wherein a form at a base of said magnet lips (101), in the vicinity of an intersection between two perpendicular planes (E, G), is contained in a square (SQ) of 3 mm×3 mm centred on said intersection.

6. The magnet wheel according to claim 1, wherein a form at a base of said magnet lips (101), in the vicinity of an intersection between two perpendicular planes (E, G), has a radius (R) of between 0.01 and 4 mm.

7. The magnet wheel according to claim 1, wherein, along an entire length of said polar teeth (10g, 11g), from said tooth bases to tips of the teeth, a ratio (e/E) between a thickness (E) of said polar teeth (10g, 11g) and a thickness (e) of said magnet lips (101) is between e/R =0.5 and e/R =1, and wherein (R) is a radius at a base of said magnet lip (101).

8. The magnet wheel according to claim 2, wherein said reservoirs (105) are situated on both sides of each of said polar teeth (10g, 11g).

9. The magnet wheel according to claim 2, wherein said reservoirs (105) are disposed under an inner annular surface (106) of said annular part which forms said plate (109).

10. The magnet wheel according to claim 3, wherein said reservoirs (105) are disposed under an inner annular surface (106) of said annular part which forms said plate (109).

11. The magnet wheel according to claim 2, wherein a form at the base of the magnet lips (101), in the vicinity of an intersection between two perpendicular planes (E, G), is contained in a square (SQ) of 3 mm×3 mm centred on said intersection.

12. The magnet wheel according to claim 3, wherein a form at a base of said magnet lips (101), in the vicinity of an intersection between two perpendicular planes (E, G), is contained in a square (SQ) of 3 mm ×3 mm centred on said intersection.

13. The magnet wheel according to claim 4, wherein a form at a base of said magnet lips (101), in the vicinity of an intersection between two perpendicular planes (E, G), is contained in a square (SQ) of 3 mm ×3 mm centred on said intersection.

14. The magnet wheel according to claim 2, wherein a form at a base of said magnet lips (101), in the vicinity of an intersection between two perpendicular planes (E, G), has a radius (R) of between 0.01 and 4 mm.

15. The magnet wheel according to claim 3, wherein a form at a base of said magnet lips (101), in the vicinity of an intersection between two perpendicular planes (E, G), has a radius (R) of between 0.01 and 4 mm.

16. The magnet wheel according to claim 4, wherein a form at a base of said magnet lips (101), in the vicinity of an intersection between two perpendicular planes (E, G), has a radius (R) of between 0.01 and 4 mm.

17. The magnet wheel according to claim 5, wherein a form at said base of said magnet lips (101), in the vicinity of said intersection between said two perpendicular planes (E, G), has a radius (R) of between 0.01 and 4 mm.

* * * * *